United States Patent
Eftekhari et al.

(10) Patent No.: US 12,463,928 B2
(45) Date of Patent: Nov. 4, 2025

(54) INGESTION AND INTERPRETATION OF ELECTRONIC MAIL

(71) Applicant: Intuit Inc., Mountain View, CA (US)

(72) Inventors: Amir R. Eftekhari, San Diego, CA (US); Phouphet Sihavong, Etobicoke (CA); Courtney Ferguson, Greenville, NC (US)

(73) Assignee: Intuit Inc., Mountain View, CA (US)

( * ) Notice: Subject to any disclaimer, the term of this patent is extended or adjusted under 35 U.S.C. 154(b) by 23 days.

(21) Appl. No.: 18/428,729

(22) Filed: Jan. 31, 2024

(65) Prior Publication Data

US 2025/0247352 A1    Jul. 31, 2025

(51) Int. Cl.
    *G06F 15/16*      (2006.01)
    *G06F 40/20*      (2020.01)
    *H04L 51/21*      (2022.01)

(52) U.S. Cl.
    CPC ............ *H04L 51/21* (2022.05); *G06F 40/20* (2020.01)

(58) Field of Classification Search
    CPC ................................ H04L 51/21; G06F 40/20
    USPC ..................................................... 709/206
    See application file for complete search history.

(56) References Cited

U.S. PATENT DOCUMENTS

| | | | | |
|---|---|---|---|---|
| 7,386,520 B2 * | 6/2008 | Hehl | ..................... | G06Q 10/107 705/400 |
| 7,536,370 B2 * | 5/2009 | Masurkar | ............ | G06F 11/0709 706/45 |
| 8,010,614 B1 * | 8/2011 | Musat | ................... | G06Q 10/107 709/224 |
| 8,131,655 B1 * | 3/2012 | Cosoi | ...................... | G06N 3/045 706/12 |
| 8,296,123 B2 * | 10/2012 | Thayer | .................... | G06F 40/49 704/7 |
| 8,321,512 B2 * | 11/2012 | McElligott | ............ | H04L 51/212 709/206 |
| 8,407,176 B2 * | 3/2013 | Boettcher | ............. | H04L 41/069 706/47 |
| 8,571,528 B1 | 10/2013 | Channakeshava | | |
| 8,738,611 B1 | 5/2014 | Zarmer et al. | | |
| 8,775,341 B1 * | 7/2014 | Commons | ................ | G06N 3/02 706/20 |
| 9,053,431 B1 * | 6/2015 | Commons | ............... | G06N 3/045 |
| 9,111,211 B2 * | 8/2015 | Mason | ................... | G06F 16/951 |
| 9,128,896 B2 * | 9/2015 | Mason | ................... | G06F 15/173 |

(Continued)

*Primary Examiner* — Alicia Baturay
(74) *Attorney, Agent, or Firm* — Paradice & Li LLP

(57) ABSTRACT

Systems and methods are described for ingesting and interpretation email messages. A pattern registry is generated for emails associated with a plurality of users based on a machine learning model interpretation of the emails. Email messages are received by a server computer, which performs pattern matching for each email message with the pattern registry. For example, embeddings for the emails may be extracted and compared to embeddings stored in a pattern database. Information for the emails is extracted based on the results of the pattern matching. For example, if a matching pattern is present in the pattern registry, the information for the email may be extracted based on the matching pattern. On the other hand, if no matching pattern is present in the pattern registry, the information for the email may be extracted using a machine learning model, such as a large language model, and the pattern registry is updated.

22 Claims, 4 Drawing Sheets

(56) References Cited

U.S. PATENT DOCUMENTS

| | | | |
|---|---|---|---|
| 9,135,211 B2* | 9/2015 | Stern | G06F 16/00 |
| 9,135,344 B2* | 9/2015 | Mason | G06F 16/9538 |
| 9,299,076 B2* | 3/2016 | Wiltzius | G06Q 10/107 |
| 9,559,999 B1* | 1/2017 | Auchmoody | H04L 51/216 |
| 9,582,592 B2* | 2/2017 | Mason | G06F 40/143 |
| 9,619,811 B2* | 4/2017 | Mason | G06Q 10/10 |
| 9,971,956 B2* | 5/2018 | Trouve | G06V 10/764 |
| 10,050,922 B2* | 8/2018 | Takahashi | H04L 51/42 |
| 10,318,844 B2* | 6/2019 | Trouve | G06F 18/22 |
| 10,339,198 B2* | 7/2019 | Comstock | G06F 16/955 |
| 10,367,899 B2* | 7/2019 | Comstock | H04L 67/02 |
| 10,504,192 B2* | 12/2019 | Mason | G06Q 50/01 |
| 10,510,000 B1* | 12/2019 | Commons | G06F 40/253 |
| 10,536,541 B2* | 1/2020 | Comstock | H04L 67/146 |
| 10,572,594 B2 | 2/2020 | Kakirwar et al. | |
| 10,705,796 B1 | 7/2020 | Doyle | |
| 11,089,121 B2* | 8/2021 | Comstock | H04L 67/535 |
| 11,195,120 B2* | 12/2021 | Anderson | H04L 63/1441 |
| 11,223,694 B2* | 1/2022 | Comstock | H04L 67/535 |
| 11,232,369 B1* | 1/2022 | Li | G06Q 50/01 |
| 11,271,629 B1* | 3/2022 | Um | H04W 24/08 |
| 11,343,374 B1* | 5/2022 | Rolia | H04M 3/36 |
| 11,443,010 B2* | 9/2022 | Comstock | H04L 67/535 |
| 11,487,879 B2* | 11/2022 | Doyle | G06F 8/77 |
| 11,544,527 B2* | 1/2023 | Shu | G06N 3/043 |
| 11,557,002 B2* | 1/2023 | Mason | G06Q 50/01 |
| 11,568,368 B2* | 1/2023 | Bar-on | G06F 40/205 |
| 11,716,401 B2* | 8/2023 | Comstock | H04L 67/10 709/224 |
| 11,816,430 B2 | 11/2023 | Torres et al. | |
| 11,868,883 B1* | 1/2024 | Commons | G10L 15/16 |
| 11,947,619 B2* | 4/2024 | Comstock | H04L 51/222 |
| 12,118,513 B1* | 10/2024 | Lu | G06N 3/04 |
| 12,159,319 B2* | 12/2024 | Mason | G06Q 50/01 |
| 12,223,519 B2* | 2/2025 | Kondamudi | G06Q 30/0204 |
| 12,326,895 B2* | 6/2025 | Lee | G06F 16/338 |
| 12,363,141 B2* | 7/2025 | Costa | G06N 3/0464 |
| 2004/0143658 A1* | 7/2004 | Newton | H04L 63/0227 709/224 |
| 2004/0250122 A1* | 12/2004 | Newton | H04L 63/20 726/2 |
| 2005/0021683 A1* | 1/2005 | Newton | H04L 43/00 709/220 |
| 2006/0200527 A1* | 9/2006 | Woods | H04L 51/212 709/206 |
| 2008/0077793 A1* | 3/2008 | Tan | G06F 21/56 713/168 |
| 2010/0017476 A1* | 1/2010 | Shue | G06Q 10/00 709/206 |
| 2019/0235831 A1* | 8/2019 | Bao | G10L 15/18 |
| 2022/0255950 A1* | 8/2022 | Dedenok | H04L 51/08 |
| 2022/0294751 A1* | 9/2022 | Slobodyanuk | H04L 51/212 |
| 2023/0325294 A1* | 10/2023 | Muthukrishnan | G06F 16/1734 709/224 |
| 2024/0015176 A1* | 1/2024 | Egbert | H04L 63/1416 |
| 2024/0078320 A1* | 3/2024 | Kim | G06F 21/577 |
| 2024/0354403 A1* | 10/2024 | Goutal | G06V 30/19 |
| 2024/0364723 A1* | 10/2024 | Zhang | H04L 63/1425 |
| 2025/0007950 A1* | 1/2025 | Wuest | H04L 63/1483 |
| 2025/0265286 A1* | 8/2025 | Lee | G06F 16/345 |

* cited by examiner

INGESTION AND INTERPRETATION OF ELECTRONIC MAIL

BACKGROUND

Electronic mail, commonly referred to as email, is a method of transmitting and receiving digital messages across the Internet or other computer networks. Email is a ubiquitous communication medium that is widely used in business, commerce, government, education, entertainment, and personal use.

Current email systems are based on a store-and-forward model. Email servers accept, forward, deliver, and store messages. Users are not required to be online simultaneously and need only connect briefly, typically to an email server, to send or receive messages. An email client, also referred to as email reader or mail user agent, is a computer program used to manage a user's email. In addition, web-based email applications allow a user to manage emails using a web browser.

Entities, such as businesses and persons, typically receive large quantities of emails, which are stored on email servers. Many, but not all, emails include information that may be useful to the recipient. For example, emails may include information that is relevant to financial relationships, life events, possessions, etc., which may be useful and other personal information that may be useful to the recipient. It can be difficult to search emails to locate useful information, e.g., using a keyword search, particularly if the user is not aware of, or has forgotten about, the presence of useful information in the emails. As a result, important information stored in emails may be lost or under-utilized.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

One innovative aspect of the subject matter described in this disclosure can be implemented as a method performed by a server computer configured to ingest and understand electronic mail (email) messages. In some implementations, the method includes generating a pattern registry for emails associated with a plurality of users based on a machine learning model interpretation of the emails. The method includes receiving transmissions including emails associated with a second plurality of users and performing pattern matching for each received email with the pattern registry. The method further includes extracting information from each received email based on results of the pattern matching. In some aspects, when a matching pattern is present in the pattern registry for a received email, the information is extracted based on the matching pattern for the received email. Additionally, when a matching pattern is not present in the pattern registry for the received email, the information is extracted using a machine learning model for the received email, and the method further includes updating the pattern registry for emails based on the machine learning model interpretation of the received email.

In some aspects, the pattern registry for emails may be generated based on the machine learning model interpretation of the emails by generating vector embeddings for the emails, and storing the vector embeddings for the emails in a database. Additionally, in some aspects, performing the pattern matching for each received email with the pattern registry may include generating vector embeddings for each received email, and comparing the vector embeddings for each received email to the vector embeddings for the emails stored in the database.

Another innovative aspect of the subject matter described in this disclosure can be implemented in a server computer configured to ingest and understand electronic mail (email) messages. The server computer can include one or more processors and a memory communicatively coupled with the one or more processors. The memory stores instructions that, when executed by the one or more processors, causes the server computer to generate a pattern registry for emails associated with a plurality of users based on a machine learning model interpretation of the emails. Execution of the instructions causes the server computer to receive transmissions comprising emails associated with a second plurality of users and perform pattern matching for each received email with the pattern registry. Execution of the instructions further causes the server computer to extract information from each received email based on results of the pattern matching. In some aspects, when a matching pattern is present in the pattern registry for a received email, the information is extracted based on the matching pattern for the received email. Additionally, when a matching pattern is not present in the pattern registry for the received email, the information is extracted using a machine learning model for the received email, and the execution of the instructions further causes the server computer to update the pattern registry for emails based on the machine learning model interpretation of the received email.

In some aspects, the server computer may be configured to generate the pattern registry for emails based on the machine learning model interpretation of the emails by being configured to generate vector embeddings for the emails, and store the vector embeddings for the emails in a database. Additionally, in some aspects, the server computer may be configured to perform pattern matching for each received email with the pattern registry by being configured to generate vector embeddings for each received email, and compare the vector embeddings for each received email to the vector embeddings for the emails stored in the database.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
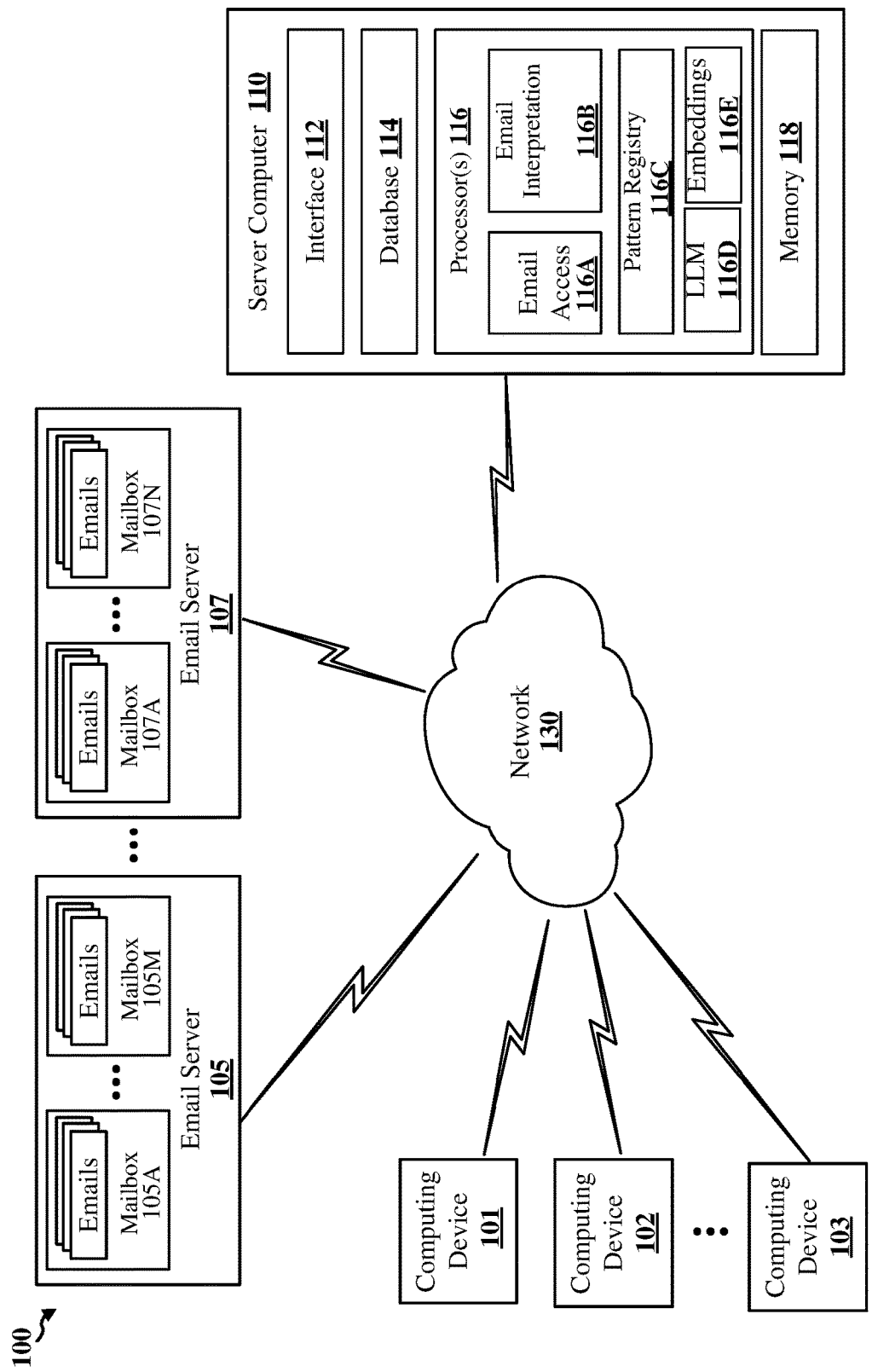
FIG. 1 depicts a schematic block diagram of a system, including a server computer configured to ingest and understand email messages within which various aspects of the subject matter disclosed herein can be implemented.

Implementations of the subject matter described in this disclosure allow for email messages from one or more email accounts (such as Gmail, Outlook, etc.) to be automatically ingested and interpreted through the use of generative artificial intelligence (AI). The automatic ingestion and interpretation of emails as discussed herein enables users to utilize their email inbox as a source of information which may be used for various purposes, such as preparing forms, responding to questionnaires, preparing taxes, etc. In various aspects, emails may be retrieved and ingested all at once, e.g., for a quick analysis, or continually monitored over time. One of the multiple applications with which the information extracted from emails may be used is for preparing tax returns or bookkeeping, which are sometimes used herein by way of example, but are not intended as limitations.

Implementations of the subject matter described in this disclosure enables connection with one or more email accounts and the use of generative AI to interpret and extract key information from email messages. The disclosed framework additionally enables pattern recognition to optimize the process so that it is performant and cost effective. The pattern recognition, for example, may use embeddings (vectorization) of emails to build a pattern database that is compared to newly received emails to determine whether similar emails have already been interpreted and information may be extracted for the new emails based on the previously interpreted emails, or whether a more expensive and time consuming generative AI process should be used to extract information for the new email. Accordingly, common or widespread email messages, e.g., from major organizations, may be quickly recognized based on pattern recognition thereby eliminating the need to leverage the generative AI process to interpret these email messages. Additionally, through the combined use of pattern recognition and generative AI, the system may be updated as new patterns are learned for email messages.

Aspects of the present disclosure including connecting to and retrieving messages, e.g., from one or more cloud-based email accounts. The messages, for example, may be retrieved all at once for a quick analysis or may be retrieved over time for continual monitoring. Aspects of the present disclosure further include using generative AI, such as a large language models (LLMs), to read and interpret the contents of the email messages, including any attachments, in order to extract information such as a detailed classification of the message and key pieces of information within the message. The information, for example, may be extracted into a canonical form. In some aspects, the extracted information may be used to produce a "digest" of information for the user. The extracted information may be provided to another application that may utilize the information, e.g., to assist in tax preparation, bookkeeping, preparing communications or forms, etc.

The use of LLMs to interpret every email message will incur a heavy cost, require extensive processing time, and use vast computing resources. Many emails received by an individual or by multiple individuals within a community are similar. For example, similar emails may be sent by an institution to multiple users. Once one of these emails is processed and interpreted using generative AI, such as an LLM, processing similar emails messages using the generative AI will result in a heavy inefficiency. Accordingly, in some aspects of the present disclosure a pattern registry may be used that enables pattern recognition of email messages. The pattern registry, may incorporate previously learned patterns from all the emails interpreted for the community or individual user. This will enable a comprehensive database for widespread email types sent from organizations so that they will be quickly recognized at a fraction of the cost that would otherwise require one-by-one interpretation using generative AI. The pattern registry, for example, may extract embeddings, such as vectors, for email messages, which may be stored along with extracted information. Embeddings extracted from new email messages may be compared to the stored embeddings in the pattern registry, to identify similar email messages that were previously received and processed using the generative AI. In some aspects, the extracted information from the previously received email messages, which may be stored in the pattern registry, may be used for the newly received email messages. In some aspects, newly received email messages with specific classifications identified through the pattern registry may be processed by the generative AI for extracting information. Thus, new email messages may be quickly classified and information for the new email messages may be efficiently extracted. In some aspects, the email messages may be interpreted first using pattern matching with the pattern registry, and second using the generative AI if the email message is determined to be unfamiliar or determined to be familiar and with a classification that requires further interpretation.

Based on one or more of the foregoing, a solution is provided that enables a fast and cost-effective, i.e., less processing and reduced reliance on generative AI, ingestion and interpretation of email messages to generate a profile on behalf of user by identifying key relevant information, such as relationships with other persons, or entities, such as banks, life events such as home purchase, job changes, or any other desired information that may be found in email.

Aspects of the subject matter disclosed herein are not a mental process that can be performed in the human mind, for example, because the human mind is not capable of generating a pattern registry for emails associated with a plurality of users based on a machine learning model interpretation of the emails. Nor is the human mind capable of practically generating vector embeddings for the emails and storing the vector embeddings in a database associated with the pattern registry. The human mind is not equipped to practically receive transmissions including emails. The human mind is additionally not equipped to practically perform pattern matching for each received email with the pattern registry. Nor is the human mind capable of practically generating vector embeddings for each received email and comparing the vector embeddings for each received email to the vector embeddings for the emails stored in the database associated with the pattern registry. The human mind is not equipped to practically extract information from each received email based on results of the pattern matching, such as extracting information based on the matching pattern for the received email when a matching pattern is present in the pattern registry for a received email, and extracting information using a machine learning model for the received email and further updating the pattern registry for emails based on the machine learning model interpretation of the received email, when a matching pattern is not present in the pattern registry for the received email. Aspects of the subject matter disclosed herein are not a method of organizing human activity because the claims of this patent application do not recite any fundamental economic practice, commercial interaction, legal interaction, or business relations. Moreover, various aspects of the present disclosure provide a technical solution to a technical problem that is rooted in computer technology, namely, ingesting emails in bulk or in a continuous fashion and quickly and efficiently extracting information from the emails without reliance on one-by-one interpretation of the emails using generative AI.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example implementations. In other instances, well-known circuits and devices are shown in block diagram form to avoid obscuring the present disclosure. Some portions of the detailed descriptions which follow are presented in terms of procedures, logic blocks, processing, and other symbolic representations of operations on data bits within a computer memory.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows an example network environment 100 within which aspects of the present disclosure can be implemented. In one or more implementations, one or more of the modules and elements shown in FIG. 1 may be omitted, repeated, and/or substituted. Accordingly, implementations should not be considered limited to the specific arrangements of modules shown in FIG. 1. Network environment 100 of FIG. 1 depicts the components of a system for email ingestion and interpretation in accordance with implementations disclosed herein.

The network environment 100 is shown to include multiple computing devices 101-103 of entities, a server computer 110, multiple email servers 105 and 107, and a communications network 130. In particular, the communications network 130 may be the Internet, a wide area network, a local area network, WiFi network, or any other suitable wired or wireless network. Although only three computing devices 101-103 are shown in the example of FIG. 1, in other implementations, any suitable number of computing devices can access and communicate with the server computer 110 over the communications network 130. The entities associated with the computing devices 101-103, for example, may be users of the email ingestion and interpretation system.

Additionally, while only two email servers 105 and 107, are illustrated, multiple email servers may be used with the server computer 110 in the network environment 100. The email servers 105 and 107, for example, may be different cloud based email servers, such as Gmail, Outlook, iCloud, or other IMAP sources. One or both of the email servers 105 may be used by one or more of the entities associated with computing devices 101-103. For example, the email server 105 may include mailboxes (e.g., mailboxes 105A-105M) and email server 107 may include mailboxes (e.g., mailboxes 107A-107N) for managing the emails received from entities by the user of one or more of the computer devices 101-103. For example, each mailbox may be configured under an email account of a different on the email servers 105 and 107 to store emails sent by an entity, e.g., person or business, to the user.

Each of the computing devices 101-103 can be any suitable wired or wireless computing device that can access and communicate with the email servers 105 and 107 and the server computer 110 over the communications network 130. The computing devices 101-103 for example, can be a desktop computer, laptop computer, tablet computer, personal digital assistant, cellular telephone, smartphone, electronic book reader, or other suitable device capable of communicating over the communications network. Although not shown in FIG. 1 for simplicity, each of the computing devices 101-103 includes at least a processor, a memory storing programs and other instructions that can be executed by the processor, and a user interface through which a respective user can access, communicate with, and interact with the email servers 105 and 107 and the server computer 110. The computing devices 101-103 may include an email client configured to display emails provided by the email servers 105 and 107 on a display device of the computing devices 101-103, or the email servers 105 and 107 may be accessed via a browser. Further, each of the computing devices 101-103 may further include an application (or browser) to electronically interface with the server computer 110 directly or indirectly, e.g., through another server computer, not shown. The user interface, for example, may include one or more of a display screen, an audio interface, a keyboard, a mouse, etc.

The server computer 110 is shown to include an interface 112, a database 114, one or more processors 116, and memory 118 coupled to the one or more processors 116. In some implementations, the various components of the server computer 110 may be interconnected by a data bus, which may be any known internal or external bus technology, including but not limited to ISA (Industry Standard Architecture), EISA (Extended Industry Standard Architecture), PCI (Peripheral Component Interconnect), PCI Express, NuBus, USB (Universal Serial Bus), Serial ATA (Serial Advanced Technology Attachment), or FireWire. In other implementations, the various components of the server computer 110 may be interconnected using other suitable signal routing resources, for example, the components may be distributed among multiple physical locations and coupled by a network connection.

The server computer 110 is configured for ingesting and interpreting emails, as discussed herein.

By way of example, the server computer 110 may configured to access email messages for users associated with the computing devices 101-103 through the communications network 130 via the electronic interface 112. The server computer 110 may be further configured to extract information from the emails using generative AI and to generate a pattern registry based on extracted patterns from the emails, e.g., vector embeddings, which may be stored in the database 114. Received emails may be pattern matched using the pattern registry to determine if the email is similar to previously received and interpreted emails. Server computer 110 may be configured to extract information from the emails based on a matching pattern when a matching pattern is present, and to extract information from the email using, e.g., using generative AI, and updating the pattern registry, if a matching pattern is not present. The server computer 110 may be further configured to generate a "digest" or otherwise accumulate information for a user and to electronically communicate the information for the user with one or more servers or users via the electronic interface 112. The interface 112 may additionally include one or more input/output (I/O) interfaces to obtain administrator inputs (such as via a web portal for a remote system or user interface devices for a local system) and, in some implementations, user inputs, to control the pattern matching process. An example interface 112 may include a wired interface or wireless interface to the internet or other means to communicably couple with other devices. For example, the interface 112 may include an interface with an ethernet cable or a wireless interface to a modem, which is used to communicate with an internet service provider (ISP) directing traffic to and from other devices (if server computer 110 is remote). The interface 112 may further include a display, a speaker, a mouse, a keyboard, or other suitable input or output elements that allow interfacing between the server computer 110 and another entity, such as an administrator.

The database 114 be associated with the pattern registry and may store the email patterns, e.g., embeddings such as vectors, as well as information from associated emails, including classification, and key information.

The one or more processors 116 may include one or more suitable processors capable of executing scripts or instructions of one or more software programs stored in server computer 110 (such as within a computer-readable medium and in memory 118) and that once programmed pursuant to instructions stored in memory operates as a special purpose computer. For example, the one or more processors 116 may be capable of executing instructions causing the one or more processors 116 to ingest and interpret emails, as discussed herein. The one or more processors 116 may include a single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the one or more processors 116 may include a combination of computing devices (such as a combination of a DSP and a microprocessor, a plurality of microprocessors, one or more microprocessors in conjunction with a DSP core, or any other such configuration). In some implementations, particular processes and methods may be performed by circuitry that is specific to a given function.

As illustrated, the one or more processors 116 is configured as a special purpose computer to perform the various functions discussed herein. For example, the one or more processors 116 may be configured to operate as an email access processor 116A, which is configured to access and synchronize emails for one or more users that are stored in cloud based email servers 105 and 107, and/or that are stored in the computing devices 101-103.

The one or more processors 116 may be further configured to operate as an email interpretation processor 116B, which may be configured to control the extraction of information from email messages, via pattern matching and/or generative AI, as discussed herein. The email interpretation processor 116B may be further configured to request feedback from users and to receive the feedback from users, e.g., via electronic transmission through the interface 112 and the communications network 130. The email interpretation processor 116B may be further configured to prepare a digest or otherwise report the extracted information from emails for a user to other applications that may be hosted by server computer 110 or that may be hosted by remote computers.

The one or more processors 116 may be further configured to operate as a pattern registry processor 116C, which may be configured to pattern match incoming emails with patterns stored in the database 114, including extracting patterns, such as vectors, from the emails, and determine the closeness of the match, e.g., based on cosine similarity or other similar techniques.

In some implementations, the one or more processors 116 may be further configured to operate as an LLM processor 116D, or other generative AI processor, which may be configured to extract information, such as classification and other key information from emails, as discussed herein. In some implementations, the LLM processor 116D may be configured to interface with an LLM stored in another server computer, not shown, in order to extract the information from emails.

In some implementations, the one or more processors 116 may be further configured to operate as an embeddings processor 116E, which may be configured to extract patterns, such as vectors, from emails, as discussed herein.

The memory 118 may be any memory (such as RAM, flash, etc.) that temporarily or permanently stores data, such as any number of software programs, executable instructions, machine code, algorithms, and the like that can be executed by the one or more processors 116 to perform one or more corresponding operations or functions. In some implementations, the memory 118 may be connected directly to or integrated with the one or more processors 116, e.g., as a processing in memory (PIM) chip. The memory 118, for example, may be a computer-readable medium that participates in providing instructions to the one or more processors 116, directly or via intermediate memory, for execution, including without limitation, non-volatile storage media (e.g., optical disks, magnetic disks, flash drives, etc.), or volatile media (e.g., SDRAM, ROM, etc.). In some implementations, hardwired circuitry may be used in place of, or in combination with, software instructions to implement aspects of the disclosure. As such, implementations of the subject matter disclosed herein are not limited to any specific combination of hardware circuitry and/or software.

The memory 118 may be a computer-readable medium that includes various instructions, such as instructions for implementing an operating system (e.g., Mac OS®, Windows®, Linux, etc.). The operating system may be multi-user, multiprocessing, multitasking, multithreading, real-time, and the like. The operating system may perform basic tasks, including but not limited to recognizing input from input devices in the interface 112, sending output to display devices in the interface 112, keeping track of files and directories on computer-readable medium, controlling peripheral devices (e.g., disk drives, printers, etc.) which can be controlled directly or through an I/O controller, and managing traffic on a bus. Computer-readable medium may further include network communications instructions to establish and maintain network connections via the interface 112 (e.g., software for implementing communication protocols, such as TCP/IP, HTTP, Ethernet, telephony, etc.).

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. A computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

The features of the server computer 110 may be implemented in a computer system that includes a back-end component, such as a data server, or that includes a middle-ware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship with each other.

One or more features or steps described herein may be implemented using an Application Programming Interface (API) and/or Software Development Kit (SDK), in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

Figure 2:
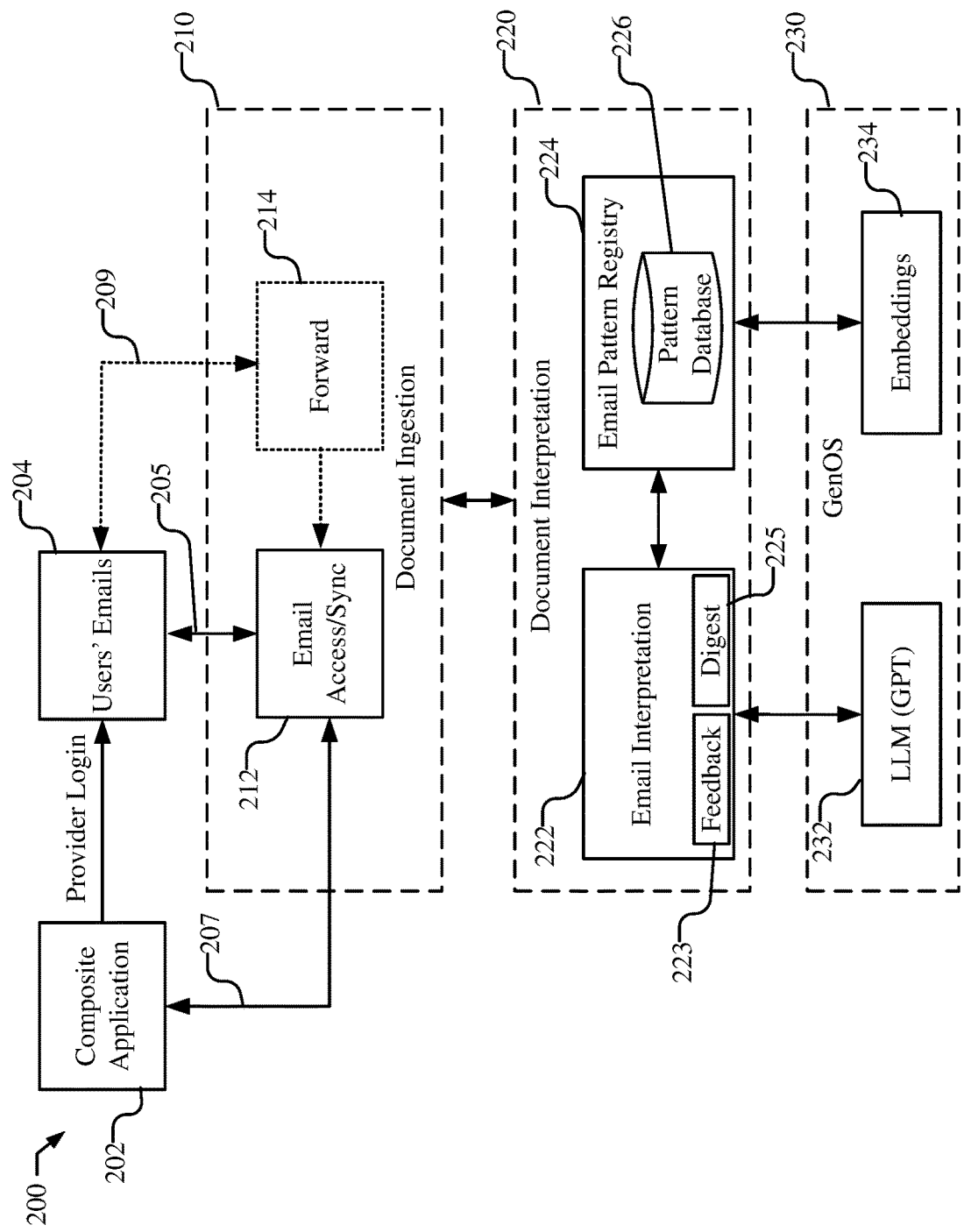
FIG. 2 shows an example architecture within which various aspects of the subject matter disclosed herein can be implemented.

FIG. 2 shows an example architecture 200, which may be implemented in the network environment 100, and specifically within server computer 110, shown in FIG. 1, within which aspects of the present disclosure can be implemented.

As illustrated, user emails are received and managed at the document ingestion stage 210. By way of example, a composite application 202 may be used to provide direct access to users' emails via email servers 204, which are received by email access and synchronization controller 212. The composite application 202, for example, may be an existing application, such as TurboTax®, QuickBooks®, or any other application that may utilize information from the user's emails, e.g., to assist in tax preparation, book keeping, or other uses such as documentation, preparing communications or forms, etc. The composite application 202 may be hosted on user's computing devices, such as computing devices 101-103 and/or in the server computer 110, shown in FIG. 1. The user's email may be accessed through email servers 204 such as Gmail, Outlook, iCloud, IMAP sources, etc. The composite application 202 may be authorized by each user to access messages directly, e.g., by providing login information for the email provider (and optionally providing authorization to the email provider to allow access by the composite application 202). The composite application 202 may connect to one or more cloud-based email accounts for each user and retrieve messages for ingestion either all at once or continually (or periodically) over time and are received by the email access and synchronization controller 212 (as indicated by arrow 205), which may correspond to the email access processor 116A shown in FIG. 1. In some implementations, users may upload selected messages to the composite application 202 for ingestion, which are received by the email access and synchronization controller 212 (as indicated by arrow 207), thereby avoiding the need for the composite application 202 to access the user's email accounts and allowing access to POP sources of emails. In some implementations, messages may be forwarded for ingestion and received by a forward inbox 214 (as indicated by dotted arrow 209). The forward inbox 214 may provide received messages for each user to the email access and synchronization controller 212, thereby avoiding the need for the composite application 202 to access the user's email accounts.

The email access and synchronization controller 212 retrieves user messages either all at once or continually (or periodically) as new messages are received. The email access and synchronization controller 212 provides the messages for each user to the document interpretation stage 220 and, in response, receives the information extracted from the messages. The extracted information may be provided by the email access and synchronization controller 212 to the composite application 202 (or other application), which may use the extracted information, e.g., to assist in tax preparation, book keeping, or other uses such as documentation, preparing communications or forms, etc.

Within the document interpretation stage 220, the email interpretation controller 222 is used to control the extraction of key information from email messages. The email interpretation controller 222, for example, may be implemented in the email interpretation processor 116B shown in FIG. 1. The email interpretation controller 222, for example, leverages the use of generative artificial intelligence, such as large language models (LLM) 232 in a generative operating system stage 230, to interpret and extract key information from messages. The LLM 232, for example, may be implemented by the LLM processor 116D shown in FIG. 1. The email interpretation controller 222 further leverages the use of pattern matching via the use of the email pattern registry 224 and embeddings 234 in the generative operating system stage 230 to interpret and extract key information from messages. The embeddings 234, for example, may be implemented by the embeddings processor 116E shown in FIG. 1.

The email interpretation controller 222, for example, may provide email messages to the LLM 232 to read the contents of the email, including any attachments, to produce a detailed classification of the message and break out key pieces of information from the message, e.g., into a canonical form. The LLM 232, by way of example, may be Generative Pre-trained Transformer 4 (GPT-4) or other similar large language model that is trained, and in some implementations fine-tuned, to receive text (and/or images) from messages as input data and respond to queries to extract relevant information, such as classification of the message, requested actions, contextual details, threads including follow-ups and resolution, and relationships. For example, the LLM 232 may extract information related to relationships with financial institutions, including credit card accounts, statements, bills, payments, checking and savings accounts, investment accounts, mortgage, crypto asset ownership, investments made or sold. The LLM 232 may extract information related to relationships with other institutions, such as medical institutions, such as health insurance company relationships, medical expenses owed, etc. The LLM 232 may extract information related to residence and major possessions, such as homeownership, rental information, property tax, car possessions or ownership, etc. The LLM 232 may extract information related to purchases and payments, e.g., for goods or services or payments to friends, or important life events, such as home purchase or sale, loan applications, employment or unemployment information, etc. The LLM 232 may extract information related to tax information, including notices for forms, such as 1099-INT, 1098, 1099-B, etc., tuition or education expenses, donations, retirement account information such as funding, rollover, withdrawals, financial losses (fire, car, accident, flood, etc.). The LLM 232 may extract information related to businesses, such as business agreements/partnerships, registration of new business, eCommerce data (sales/profits), customer inquiries, sales, estimates, invoices, etc.

The extraction of information from each new message using the LLM 232 is relatively time consuming and expensive. Accordingly, the email interpretation controller 222 further generates a pattern registry 224 for email messages. For example, the email interpretation controller 222 may provide email messages to the pattern registry 224 for analysis. The pattern registry 224 provides the messages to the embeddings 234 in the generative operating system stage 230, which generates, e.g., a numerical representation of each message, expressed as a vector. It should be understood that expressions of patterns other than vectors may be used if desired. The embeddings 234, for example, may be produced using a trained machine learning model, and may be produced using embedding models, such as Bidirectional Encoder Representations of Transformers (BERT), Word2Vec, Singular Value Decomposition (SVD), Principal Component Analysis (PCA), etc. Based on the patterns extracted from messages by the pattern registry 224 and embeddings 234 and the information extracted from the messages by the LLM 232, a pattern database 226 may be produced. The pattern database 226, for example, may be a database of vectors associated with information extracted from the messages. The pattern database 226 may be generated for each user or for a community of users. The pattern registry 224 and pattern database 226, for example, may be implemented by pattern registry processor 116C and database 114 shown in FIG. 1. The pattern database 226 may be encrypted and otherwise protected to maintain confidentiality. In some implementations, the pattern database 226 may only store non-confidential information, i.e., no information that is associated with any one particular user.

Once the pattern database 226 is produced, a new message received at the document interpretation stage 220 may be provided first to the pattern registry 224 to extract the pattern (vector) via embeddings 234 from the new message, which may be compared to patterns stored in the pattern database 226. The vector space, for example, quantifies the semantic similarity between categories, and embedding vectors that are close to each other may be considered similar. The pattern registry 224, for example, may determine the semantic similarity of the new message with vectors in the pattern database 226 based on the cosine similarity between embeddings or using other similar techniques. Accordingly, new messages may be recognized and properly categorized based on patterns in the pattern database 226, thereby eliminating or reducing the need to use the LLM 232 to interpret each new message. For example, patterns for common or widespread emails from major organizations may be stored in the pattern database 226, and pattern matching by the pattern registry 224 may be used to properly categorize newly received emails as one of the common or widespread emails, thereby avoiding the need to independently interpret the newly received email using LLM 232. In some implementations, if a matching pattern is found for a new message by the pattern registry 224, information associated with the pattern may be provided to the email interpretation controller 222 and there is no need for the email interpretation controller 222 to provide the new message to the LLM 232 for interpretation and extraction of information. In some implementations, however, it may be desirable to use the LLM 232 for interpretation and extraction of information from a new message, even if a matching pattern is found by the pattern registry 224. For example, specific information such as dollar amounts, test results, names, etc. may not be stored in the pattern database 226. The pattern registry 224 may determine, based on the matching pattern, that the new message includes specific information, and accordingly, the email interpretation controller 222 may provide the new message to the LLM 232 to extract the information.

If a matching pattern is not found by the pattern registry 224 for a newly received email, the email interpretation controller 222 may provide the email to the LLM 232 for interpretation and extraction of information. The pattern database 226 may be updated based on the pattern extracted from the newly received email by the embeddings 234 and the extracted information by the LLM 232 so that the pattern associated with the newly received email may be used for pattern matching with subsequently received messages for the same user (if the pattern database 226 is a personal database for each user) or subsequently received messages for other users (if the pattern database 226 is a community database).

In some implementations, the pattern database 226 may be updated by the pattern registry 224 over time. For example, if patterns stored in the pattern database 226 are not matched with newly received emails for a predetermined threshold amount of time, e.g., the pattern may be removed from the pattern database 226.

In some implementations, the email interpretation controller 222 may request feedback 223 to validate or modify information extracted from messages via the LLM 232 or via the pattern registry 224. By way of example, a request for verification or clarification may be electronically transmitted to the user associated with the new message. The user may confirm or reject the extracted information or may provide additional information. The information obtained through feedback 223 may be used to validate or modify the information stored in the pattern database 226 and/or the information that is provided to the composite application 202 (or other application) by the email access and synchronization controller 212.

In some implementations, the email interpretation controller 222 may use the information extracted from messages via the LLM 232 or via the pattern registry 224 to generate a digest 225 for a user. The digest 225, for example, may be a profile for the user in the relevant domain, e.g., financial, medical, relationships, etc. In some implementations, the digest 225 may be provided to the composite application 202 (or other application) by the email access and synchronization controller 212. In some implementations, the digest 225 may be used by the email interpretation controller 222 to assist in determining which messages include relevant information that is to be extracted. For example, based on pattern matching information from the pattern registry 224 and the digest 225, the email interpretation controller 222 may determine whether a message should be forwarded to the LLM 232 for interpretation and extraction of information.

The email interpretation controller 222 may control and adjust the flow of new messages to the pattern registry 224 and the LLM 232. The control and flow within architecture 200, for example, may be based on considerations such as desired reliability, accuracy of matches, cost of for interpretation and extraction of information by LLM 232, throughput, etc. The control of the flow within architecture 200 by the email interpretation controller 222, for example, may be adjusted automatically e.g., based on control parameters set by an administrator via interface 112 (shown in FIG. 1), or may be adjusted manually by a user or the administrator via system interface 112.

Figure 3:
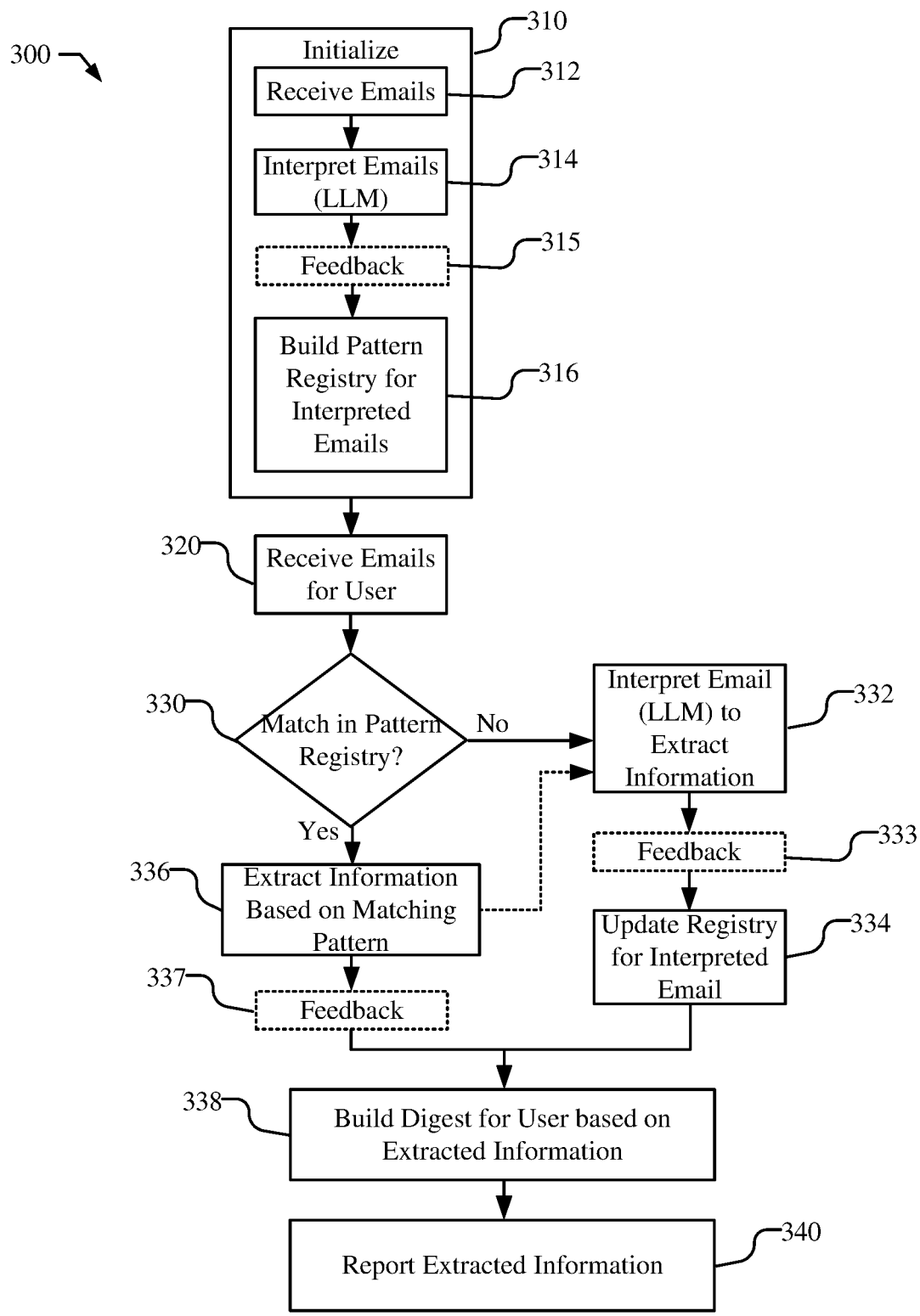
FIG. 3 shows an illustrative flowchart depicting an example operation for ingestion and interpretation of email messages, according to some implementations.

FIG. 3 shows an illustrative flowchart depicting an example operation 300 for ingestion and interpretation of email messages, according to some implementations. Operation 300 may be performed by one or more processors of a server computer hosting or associated with an information extraction system as discussed herein. For example, in some implementations, operation 300 may be performed by the server computer 110 shown in FIG. 1 or may be performed, generally, by the architecture 200 illustrated in FIG. 2.

Operation 300, for example, may include initializing 310 a pattern registry, such as pattern registry 224 shown in FIG. 2. Initializing the pattern registry includes building up a pattern database in the pattern registry, that may be used for pattern matching incoming messages. The pattern registry may be initialized based on emails from multiple users, i.e., a community database may be built, or the pattern registry may be initialized for each user based on emails from the individual user, i.e., a personal database may be built for each user.

As illustrated, as part of the process of initializing 310, at 312, emails are received. The emails may be received with direct access via one or more email servers, which may be controlled via authorization through a composite application, such as composite application. The emails, for example, may be retrieved for ingestion all at once or over time. In some implementations, the emails may be received indirectly, e.g., via the composite application itself. In some implementations, the emails may be received after being forwarded to the server computer.

At 314 of the process of initializing 310, the emails may be interpreted by a large language model, such as LLM 232 shown in FIG. 2, and information from the emails may be extracted. The email messages, for example, may be provided to the LLM, which interprets the message, including any attachments, and extracts information into a canonical form. The interpretation of the email, for example, may extract information such as a classification of the message, and other desired key pieces of information, such as primary parties in the message, secondary parties in the message (such as third party recipients of payments), requested actions, contextual details, threads including follow-ups and resolution, relationships, etc.

In some implementations, the interpretation of the email, e.g., the information extracted from emails by the LLM, may be validated or modified. For example, at 315, feedback may be used to validate or modify the extracted information. Feedback may be obtained, e.g., by electronically transmitting a request for verification or clarification, e.g., to the user, and electronically receiving a response, e.g., confirmation, modification, or rejection of the extracted information.

At 316 of the process of initializing 310, the pattern registry for the interpreted emails is built, e.g., as pattern registry 224 and pattern database 226 shown in FIG. 2. Embeddings, e.g., expressed as a vector, are produced for each message and stored in the pattern database with the associated information extracted from each respective message.

With the pattern registry built, new emails may be compared to the pattern registry to determine the semantic similarity of the new message with previously received emails used to initialize the pattern registry. The pattern registry may be configured, e.g., during the process of initializing 310 to control the matching process, e.g., the semantic similarity required for a match.

As illustrated, at 320, emails for a user are received. The emails for the user may be received as discussed in reference to 312. For example, the user's emails may be received with direct access via one or more email servers, which may be controlled via authorization through a composite application, such as composite application. The emails may be retrieved for ingestion all at once or over time. In some implementations, the emails may be received indirectly, e.g., via the composite application itself, or may be forwarded to the server computer.

At 330, each new email is compared to patterns in the pattern registry to determine if there is a match. Patterns are extracted from each new email, e.g., based on embeddings expressed as vectors. The extracted pattern from each new email is compared to the patterns stored in the pattern database to determine semantic similarity. For example, a cosine similarity between embeddings in the pattern of the new email and the patterns stored in the pattern database may be determined. Based on the semantic similarity, the server computer determines if new email matches an entry in the pattern registry.

At 332, if the new email does not match an entry in the pattern registry, the email is provided to the LLM for interpretation and extraction of information. The information may be extracted from the email by the LLM as discussed in reference to 314. For example, the LLM may interpret the message, including any attachments, and extracts information into a canonical form. The interpretation of the email, for example, may extract information such as a classification of the message, and other desired key pieces of information, such as primary parties in the message, secondary parties in the message (such as third party recipients of payments), requested actions, contextual details, threads including follow-ups and resolution, relationships, etc.

In some implementations, the interpretation of the email, e.g., the information extracted from the email by the LLM, may be validated or modified. For example, at 333, feedback may be used to validate or modify the extracted information. Feedback may be obtained, e.g., by electronically transmitting a request for verification or clarification, e.g., to the user, and electronically receiving a response, e.g., confirmation, modification, or rejection of the extracted information.

At 334, the pattern registry may be updated based on the information extracted by the LLM and the associated pattern for the email, and in some implementations, based on the feedback received at 333. In some implementations, if patterns in the pattern registry are not matched to an email for a predetermined time period, the pattern may be removed from the pattern registry.

It should be understood that the process of initializing 310 may not necessarily be a separate process, but may be performed by determining no match exists at 330, interpreting the email to extract information at 332, optionally receiving feedback at 333, and updating the registry at 334. In other words, the process of initializing 310 may include an initial determination of whether received emails match the pattern registry (as discussed at 330), followed by interpreting the emails with the LLM and building the pattern registry until a match with the pattern registry is detected for a newly received email.

At 336, if the new email matches an entry in the pattern registry at 330, information for the new email is extracted from the pattern database based on the matching pattern. For example, information that is stored in the pattern database with the associated matching pattern may be extracted and used as extracted information for the new email. In some implementations, as illustrated by with the dotted arrow, the email may also be provided to the LLM for interpretation and extraction of information at 332, even if a matching pattern is found at 330. For example, the email may include specific information, such as dollar amounts, names, etc., that is not stored in the pattern registry and is extracted by the LLM at 332. If the LLM is used to extract specific information that is not stored in the pattern registry, there is no need to update the pattern registry at 334.

In some implementations, the interpretation of the email, e.g., the information extracted from the pattern registry, may be validated or modified. For example, at 337, feedback may be used to validate or modify the extracted information. Feedback may be obtained, e.g., by electronically transmitting a request for verification or clarification, e.g., to the user, and electronically receiving a response, e.g., confirmation, modification, or rejection of the extracted information.

At 338, a digest for the user may be built based on the extracted information for the email, e.g., extracted from either the LLM at 332 or the pattern registry at 336, or both the LLM at 332 and the pattern registry at 336, and in some implementations, based on the feedback received at 333 and 337. The digest may be a profile for the user. In some implementations, the digest may be used to assist in determining a match in the pattern registry for the user, e.g., by filtering or prioritizing the patterns used for matching based on the known profile of the user.

At 340, the extracted information for the email may be reported to the composite application or other applications that may use the information. The extracted information, for example, may be based on the information extracted from either the LLM at 332 or the pattern registry at 336, or both the LLM at 332 and the pattern registry at 336, and in some implementations, based on the feedback received at 333 and 337. In some implementations, the extracted information may be in the form of the digest from 338. The information may be reported, e.g., by electronic transmission by the server computer to composite application, e.g., via electronic interface 112 shown in FIG. 1.

Figure 4:
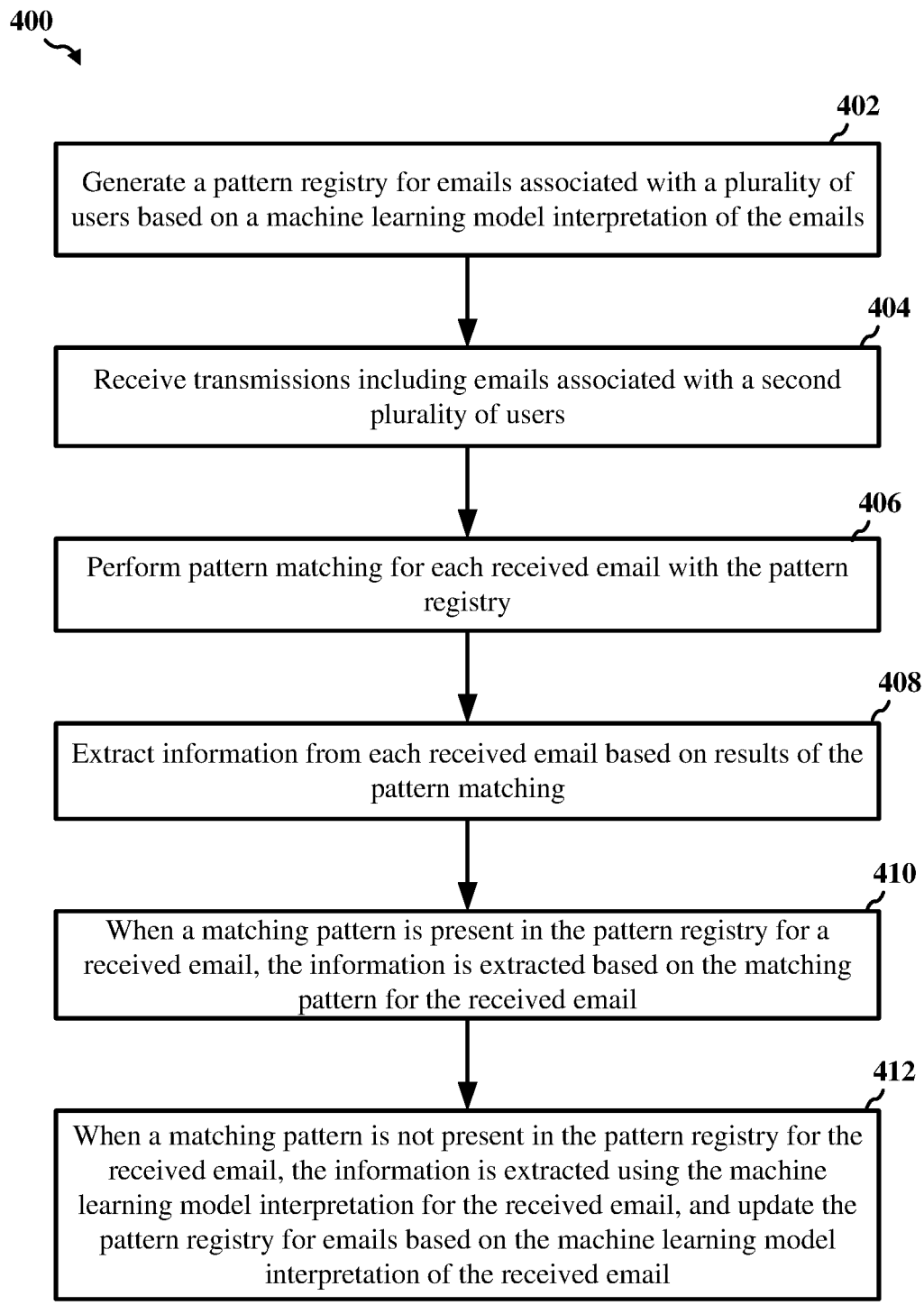
FIG. 4 shows an illustrative flowchart depicting an example method for ingesting and interpretation email messages, according to some implementations.

FIG. 4 shows an illustrative flowchart depicting an example method 400 for ingesting and interpreting email messages, according to some implementations. The example method 400 is described as a computer-implemented method, e.g., performed by the server computer 110 illustrated in FIG. 1 that is configured with the architecture 200 shown in FIG. 2.

At 402, a pattern registry is generated for emails associated with a plurality of users based on a machine learning model interpretation of the emails. Generating a pattern registry for emails, for example, is discussed in reference to the document interpretation stage 220 in FIG. 2 and the process of initializing 310 in FIG. 3 or the process of determining no match exists at 330, interpreting the email to extract information at 332, optionally receiving feedback at 333, and updating the registry at 334 in FIG. 3. The pattern registry, for example, may include a pattern database. The pattern database may be generated based on emails from multiple users, e.g., a community database. In some implementations, the pattern registry may be generated for emails for a single user, e.g., as an individual database.

At 404, transmissions are received that include emails associated with a second plurality of users, e.g., as discussed in the document ingestion stage 210 in FIG. 2 and at 320 in FIG. 3. The second plurality of users may include one or more users whose emails were used to generate the pattern registry at 402. The emails may be received from email servers 105, 107, via the communications network 130, and system interface 112, shown in FIG. 1. In some implementations, for example, the transmissions including emails is received by accessing email accounts associated with the plurality of users or receiving forwarded emails from the email accounts associated with the plurality of users. The emails may be received from multiple email accounts associated with individual users.

At 406, pattern matching is performed for each received email with the pattern registry, e.g., as discussed in the document interpretation stage 220 in FIG. 2, and at 330 in FIG. 3. In some implementations, a closeness of match parameter for the pattern matching may be adjustable, e.g., as discussed at the document interpretation stage 220 in FIG. 2 and at 330 in FIG. 3.

At 408, information is extracted from each received email based on results of the pattern matching, e.g., as discussed at the document interpretation stage 220 in FIG. 2 and at 332 or 336 in FIG. 3. For example, at 410, when a matching pattern is present in the pattern registry for a received email, the information is extracted based on the matching pattern for the received email, e.g., as discussed at the document interpretation stage 220 in FIG. 2 and at 336 in FIG. 3. In some implementations, for example, when the matching pattern is present in the pattern registry, the information may be extracted based on the matching pattern for the received email by at least one of extracting the information from the matching pattern and extracting the information using the machine learning model for the received email based on the matching pattern as discussed at the document interpretation stage 220 in FIG. 2 and at 336 and 332 in FIG. 3. In another example, at 412, when a matching pattern is not present in the pattern registry for the received email, the information is extracted using a machine learning model for the received email, and the pattern registry is updated for emails based on the machine learning model interpretation of the received email, e.g., as discussed at the document interpretation stage 220 in FIG. 2 and at 332 and 334 in FIG. 3. In some implementations, for example, the machine learning model is a large language model, such as GPT-4.

In some implementations, a digest of information for each user is generated based on the information extracted from received emails associated with each user, e.g., as discussed at the document interpretation stage 220 in FIG. 2 and at 338 in FIG. 3.

The pattern registry is generated for emails based on the machine learning model interpretation of the emails by generating vector embeddings for the emails and storing the vector embeddings for the emails in a database, e.g., as discussed in reference to the document interpretation stage 220 and the generative operating system stage 230 in FIG. 2 and the process of initializing 310 in FIG. 3. Additionally, pattern matching may be performed for each received email with the pattern registry by generating vector embeddings for each received email and comparing the vector embeddings for each received email to the vector embeddings for the emails stored in the database, e.g., as discussed in reference to the document interpretation stage 220 and the generative operating system stage 230 in FIG. 2 and at 330 in FIG. 3.

In some implementations, patterns from the pattern registry may be removed if not matched to a received email for a predetermined time period, e.g., as discussed at the document interpretation stage 220 in FIG. 2 and at 334 in FIG. 3.

Additionally, in some implementations, the method may include sending transmissions to computers associated with users requesting user feedback on the machine learning model interpretation of the emails, and receiving transmissions from the computers associated with users with the user feedback on the machine learning model interpretation of the emails, where the pattern registry is generated for emails associated with a plurality of users is further based on the user feedback, e.g., as discussed at the document interpretation stage 220 in FIG. 2 and at 315 and 316 in FIG. 3.

As used herein, a phrase referring to "at least one of" a list of items refers to any combination of those items, including single members. As an example, "at least one of: a, b, or c" is intended to cover: a, b, c, a-b, a-c, b-c, and a-b-c.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various illustrative logics, logical blocks, modules, circuits, and algorithm processes described in connection with the implementations disclosed herein may be implemented as electronic hardware, computer software, or combinations of both. The interchangeability of hardware and software has been described, in terms of functionality, and illustrated in the various illustrative components, blocks, modules, circuits and processes described above. Whether such functionality is implemented in hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the broadest scope consistent with this disclosure, the principles and the novel features disclosed herein.

What is claimed is:

1. A method comprising:
    generating, by a server computer, a pattern registry for emails associated with a plurality of users based on a machine learning model interpretation of the emails;
    receiving, by the server computer, transmissions comprising emails associated with a second plurality of users;
    performing, by the server computer, pattern matching for each received email with the pattern registry; and
    extracting information, by the server computer, for each received email based on results of the pattern matching, wherein:
        when a matching pattern is present in the pattern registry for a received email, the information for the received email is extracted from the pattern registry based on the matching pattern; and
        when a matching pattern is not present in the pattern registry for the received email, the information for the received email is extracted from the received email using a machine learning model, and the method further comprises updating the pattern registry for emails based on the machine learning model interpretation of the received email.

2. The method of claim 1, further comprising generating a digest of information for each user based on the information extracted from received emails associated with each user.

3. The method of claim 1, wherein the server computer receives the transmissions comprising emails by at least one of accessing email accounts associated with the plurality of users and receiving forwarded emails from the email accounts associated with the plurality of users.

4. The method of claim 1, wherein emails are received from multiple email accounts associated with individual users.

5. The method of claim 1, wherein the machine learning model is a large language model.

6. The method of claim 1, wherein generating the pattern registry for emails based on the machine learning model interpretation of the emails comprises:
    generating vector embeddings for the emails; and
    storing the vector embeddings for the emails in a database.

7. The method of claim 6, wherein performing pattern matching for each received email with the pattern registry comprises:
    generating vector embeddings for each received email; and
    comparing the vector embeddings for each received email to the vector embeddings for the emails stored in the database.

8. The method of claim 1, wherein when the matching pattern is present in the pattern registry for the received email, the information for the received email is further extracted from the received email using the machine learning model based on the matching pattern.

9. The method of claim 1, the method further comprising removing patterns from the pattern registry if not matched to a received email for a predetermined time period.

10. The method of claim 1, further comprising:
    sending, by the server computer, transmissions to computers associated with users requesting user feedback on the machine learning model interpretation of the emails; and
    receiving, by the server computer, transmissions from the computers associated with users with the user feedback on the machine learning model interpretation of the emails;
    wherein generating the pattern registry for emails associated with a plurality of users is further based on the user feedback.

11. The method of claim 1, wherein a closeness of match parameter for the pattern matching is adjustable.

12. A server computer comprising:
    one or more processors; and
    a memory communicatively coupled with the one or more processors and storing instructions that, when executed by the one or more processors, causes the server computer to:
        generate a pattern registry for emails associated with a plurality of users based on a machine learning model interpretation of the emails;
        receive transmissions comprising emails associated with a second plurality of users;
        perform pattern matching for each received email with the pattern registry; and
        extract information for each received email based on results of the pattern matching, wherein:
            when a matching pattern is present in the pattern registry for a received email, the information for the received email is extracted from the pattern registry based on the matching pattern; and
            when a matching pattern is not present in the pattern registry for the received email, the information for the received email is extracted from the received email using a machine learning model, and the pattern registry for emails is updated based on the machine learning model interpretation of the received email.

13. The server computer of claim 12, wherein the server computer is further configured to generate a digest of information for each user based on the information extracted from received emails associated with each user.

14. The server computer of claim 12, wherein the server computer is configured to receive the transmissions comprising emails by being configured to at least one of access email accounts associated with the plurality of users and receive forwarded emails from the email accounts associated with the plurality of users.

15. The server computer of claim 12, wherein emails are received from multiple email accounts associated with individual users.

16. The server computer of claim 12, wherein the machine learning model is a large language model.

17. The server computer of claim 12, wherein the server computer is configured to generate the pattern registry for emails based on the machine learning model interpretation of the emails by being configured to:
   generate vector embeddings for the emails; and
   store the vector embeddings for the emails in a database.

18. The server computer of claim 17, wherein the server computer is configured to perform pattern matching for each received email with the pattern registry by being configured to:
   generate vector embeddings for each received email; and
   compare the vector embeddings for each received email to the vector embeddings for the emails stored in the database.

19. The server computer of claim 12, wherein the server computer is further configured to, when the matching pattern is present in the pattern registry for the received email, extract the information for the received email using the machine learning model based on the matching pattern.

20. The server computer of claim 12, wherein the server computer is further configured to remove patterns from the pattern registry if not matched to a received email for a predetermined time period.

21. The server computer of claim 12, wherein the server computer is further configured to:
   send transmissions to computers associated with users requesting user feedback on the machine learning model interpretation of the emails; and
   receive transmissions from the computers associated with users with the user feedback on the machine learning model interpretation of the emails;
   wherein the server computer is configured to generate the pattern registry for emails associated with a plurality of users further based on the user feedback.

22. The server computer of claim 12, wherein a closeness of match parameter for the pattern matching is adjustable.

* * * * *